J. A. MOXEY.
FIFTH WHEEL FOR VEHICLES.
APPLICATION FILED MAY 12, 1913.

1,122,214.

Patented Dec. 22, 1914.

Witnesses:
J. N. Daggett
W. W. Loftus

Inventor.
James A. Moxey.
by Chas. E. Lord
Atty.

UNITED STATES PATENT OFFICE.

JAMES A. MOXEY, OF CHICAGO, ILLINOIS, ASSIGNOR TO INTERNATIONAL HARVESTER CORPORATION, A CORPORATION OF NEW JERSEY.

FIFTH-WHEEL FOR VEHICLES.

1,122,214.  Specification of Letters Patent.  Patented Dec. 22, 1914.

Application filed May 12, 1913. Serial No. 767,095.

*To all whom it may concern:*

Be it known that I, JAMES A. MOXEY, a citizen of the United States, residing at Chicago, in the county of Cook and State of Illinois, have invented certain new and useful Improvements in Fifth-Wheels for Vehicles, of which the following is a full, clear, and exact specification.

My invention relates to vehicles such as wagons, and particularly to fifth wheels therefor.

Heretofore it has been the general custom in vehicle manufacture to omit the fifth wheels on the lighter types of wagons, known as farm wagons, and while it has generally been conceded that the employment of such a device would add to the efficiency and durability of a wagon of this type, the difficulty of adapting the present forms of fifth wheels to this purpose, on account of their natural complications, coupled with their unsuitable operation and necessary expensiveness, have prevented their adoption, except in a few isolated cases.

My object, therefore, is to produce certain improvements in the arrangement and combination of the various parts of a device of this class whereby a simple, efficient and inexpensive construction will result. A further object is to produce a fifth wheel designed for use on any ordinary form of horse-drawn vehicle and capable of being readily and easily attached thereto by any person of ordinary skill. And finally, it is my object in connection with a device of this class to provide for a general distribution of the strain on the bolster and sand board of the vehicle to which the fifth wheel is attached. I attain these objects by means of four semi-circular plates arranged in operative positions, each having its ends bent at right angles to its body portion to form braces by means of which the plates are secured in position, two of said plates being secured to the sand board and the remaining two being secured to the bolster of the vehicle.

The foregoing and other objects and advantages of my improved fifth wheel will become readily apparent from the following detailed description of one form of my invention taken in conjunction with the accompanying drawing, in which—

Figure 1:
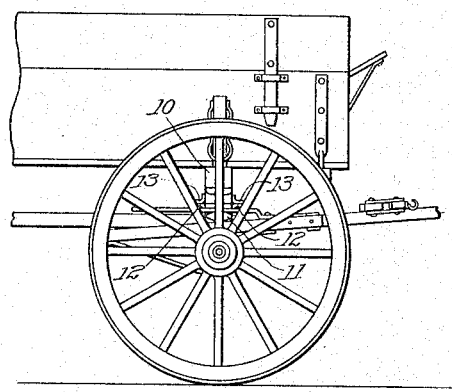
Figure 2:
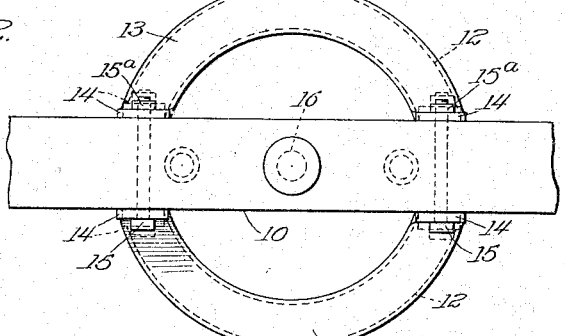
Figure 3:
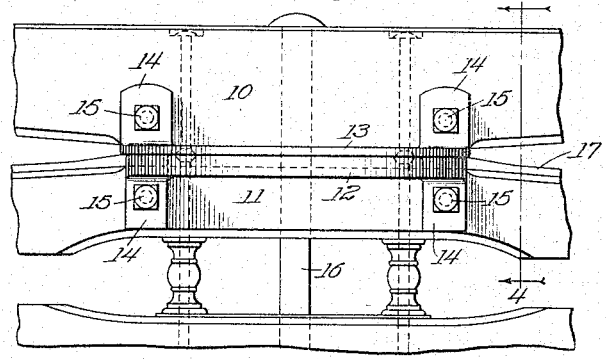
Figure 4:
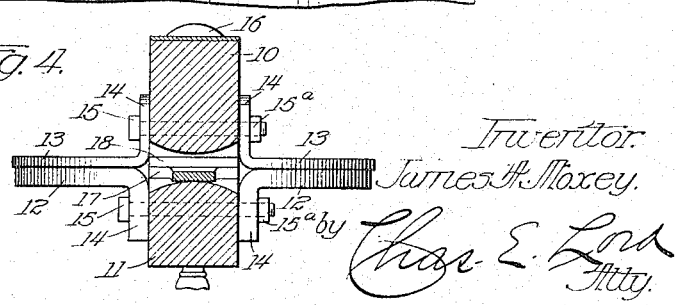

Figure 1 shows a side elevation of the front portion of a wagon to which my invention is applied. Fig. 2 shows a plan view of a portion of a vehicle bolster having my improved fifth wheel attached thereto; Fig. 3 shows a front elevation of a portion of the vehicle bolster and sand board having my device attached thereto; and, Fig. 4 shows a sectional view taken on the line 4—4 of Fig. 3.

Similar numerals refer to corresponding parts throughout the several views.

In the drawing, the front gear of a vehicle is shown as provided with a bolster 10 and sand board 11 of conventional form and arrangement. My improved fifth wheel comprises two lower members 12 and two upper members 13 arranged in contacting positions on opposite sides of the bolster and sand board. Each of these members comprises a substantially semi-circular shaped plate or ring having its ends bent at right angles to its body portion to form braces 14. For securing the plates in position on the vehicle, I employ four bolts 15, two extended horizontally through the sand board and two extended in a similar manner through the bolster. Each end of each of these bolts is inserted in an opening formed in one of the braces 14, and when the bolts are secured in position with the nuts $15^a$, a rigid clamping of the plates is effected. The lower members 12, it will be seen, are constructed of comparatively thick material to enable them to better withstand the strains incident to their functions. The upper members 13 are formed of material considerably wider than that used in the lower members in order that the edges of the upper members will project and thus protect the contacting surfaces of the plates from dust, dirt and the like. Two of the plates, it will be seen, are arranged on opposite sides of the sand board and secured thereto and the remaining two are secured in position to opposite sides of the bolster. Obviously, such an arrangement offers important advantages in that it provides for a maximum distribution of the excessive strains to which the sand board and bolster are subjected and relieves the strain on the central portions which necessarily are the weakest parts due to the large openings formed therein for the reception of the king bolt 16.

In the usual forms of wagons or similar vehicles, three vertical openings are formed, extending entirely through the bolster and sand board, the large central opening being for the reception of the king bolt, and the openings at either side being designed for the reception of bolts employed for securing the sand board and bolster plates 17 and 18 in position. Inasmuch as the greatest strain on the sand board and bolster is that applied by the reach pulling on the king bolt, it is obvious that there is a tendency for the bolster and sand board to split apart in a vertical direction. However, owing to the manner in which my device is applied to these parts, it will be seen that the bracing members 14, held in engagement with the vertical sides of the bolster and sand board by means of the bolts 15, will act as reinforcements against any vertical splitting of these parts.

It is obvious that my improved fifth wheel performs all of the functions and offers all of the advantages of the most expensive forms of these devices and, at the same time, on account of the comparatively small number of parts and the small amount of material used in the construction thereof, my device can be manufactured in a practical form at a cost sufficiently low to make possible its general use on the more inexpensive forms of vehicles. A further advantage is offered in that my device is in the nature of an attachment and can be applied to the well known forms of horse-drawn vehicles by any person of ordinary skill and without the employment of other than ordinary tools. Furthermore, the method of attaching my device to the vehicle permits, if desired, a small space to be left between the contacting surfaces of the plates, so that thereby the fifth wheel comes into active service only when necessary and a more flexible movement of the bolster is permitted.

While I have shown and described but one form of my invention, it is obvious that it is capable of modification, and I, therefore, do not desire to be limited in the interpretation of the following claims except as may be necessary from the state of the prior art.

I claim:

1. In a vehicle, a bolster, a sand board, wearing plates thereon, and a fifth wheel comprising contacting plates engaging the vertical sides of the bolster and sand board, and coacting with the wearing plates thereon to form even bearing surfaces.

2. In a vehicle, a fifth wheel comprising four plates, two of said plates being secured to the sand board and the other two being secured to the bolster of the vehicle on the vertical sides thereof.

3. In a vehicle, a fifth wheel comprising four substantially semi-circular rings each having its ends bent at right angles to its body portion to form braces and secured in position by means of bolts extended through said braces.

4. In a vehicle, a fifth wheel comprising four substantially semi-circular rings each having its ends bent at right angles to the body portion to form braces, said plates being arranged in contacting positions and secured to the bolster and to the sand board of the vehicle by means of bolts extended horizontally through said sand board and bolster and inserted in openings formed in said braces.

5. In a vehicle, a fifth wheel comprising four substantially semi-circular rings secured in operative position on the vehicle, two of said rings being arranged above the other two with the edges of the upper rings projecting beyond the edges of the lower ones.

6. A fifth wheel comprising four substantially semi-circular rings each having its ends provided with angular portions to form braces and securing members.

7. In a vehicle, the combination of a sand board, a bolster, plates arranged on opposite sides of said sand board and bolster in positions to form contacting surfaces, and means for securing said plates to the sides of the sand board and bolster.

8. In a vehicle, the combination of a sand board, a bolster arranged above said sand board, a king bolt for said sand board and bolster, four substantially semi-circular plates arranged in pairs one above the other on opposite sides of said bolster and sand board, each of said plates being provided at its ends with angular portions to engage the adjacent side of the sand board or bolster, and means for securing the angular portions on the upper plates to the bolster, and the angular portions on the lower plates to the sand board.

9. In a vehicle, the combination of a sand board, a bolster, wearing plates for said sand board and bolster, and a fifth wheel comprising four plates, two of said plates being secured to the sand board and two to the bolster, said fifth wheel plates coacting with the wearing plates in a manner to form continuous bearing surface.

In testimony whereof I affix my signature, in the presence of two witnesses.

JAMES A. MOXEY.

Witnesses:
G. E. SUNDERLAND,
W. E. STAPLES.

Copies of this patent may be obtained for five cents each, by addressing the "Commissioner of Patents, Washington, D. C."